No. 659,920. Patented Oct. 16, 1900.
A. W. GRANT.
RUBBER TIRE.
(Application filed Mar. 23, 1900.)
(No Model.)
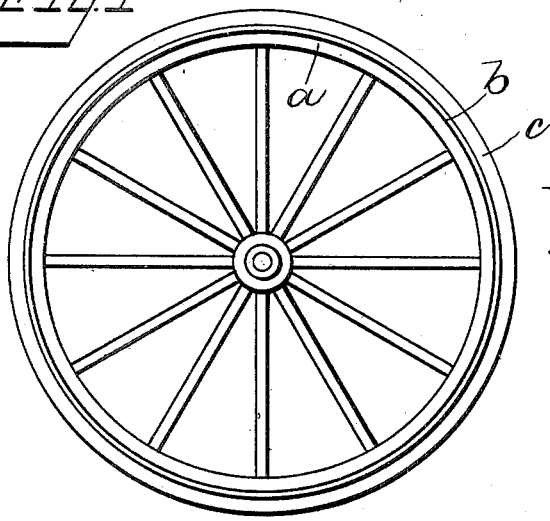
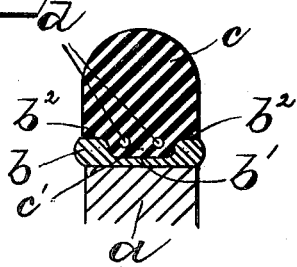
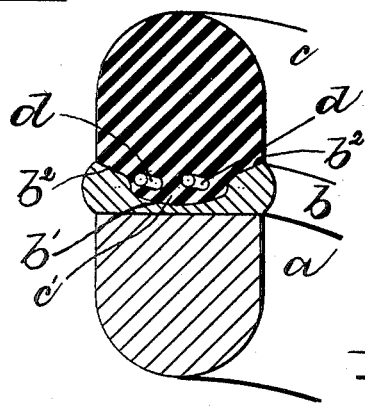
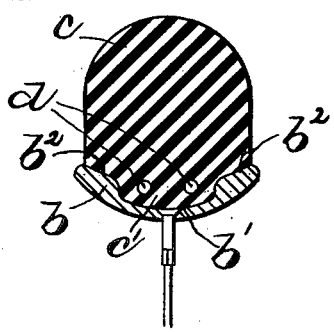
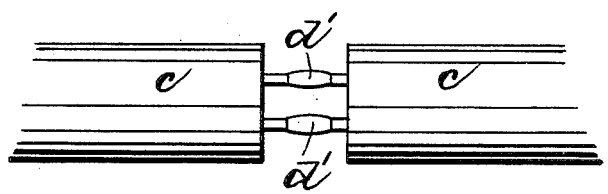
Witnesses
Frank L. Walker
Chas. I. Welch
Inventor
Arthur W. Grant
By his Attorney

UNITED STATES PATENT OFFICE.

ARTHUR W. GRANT, OF SPRINGFIELD, OHIO, ASSIGNOR TO THE CONSOLIDATED RUBBER TIRE COMPANY, OF NEW YORK, N. Y.

RUBBER TIRE.

SPECIFICATION forming part of Letters Patent No. 659,920, dated October 16, 1900.

Application filed March 23, 1900. Serial No. 9,945. (No model.)

*To all whom it may concern:*

Be it known that I, ARTHUR W. GRANT, a citizen of the United States, residing at Springfield, in the county of Clark and State of Ohio, have invented certain new and useful Improvements in Rubber Tires, of which the following is a specification.

My invention relates to improvements in rubber tires, and especially to that class of tires which are adapted for ordinary road-vehicles, such as carriages, wagons, automobiles, &c.

My invention consists in the constructions and combinations of parts hereinafter described, and set forth in the claims.

In the accompanying drawings, Figure 1 is a side elevation of a wheel to which my improved tire has been applied. Fig. 2 is a cross-section of the wheel-felly with the tire and rim shown partly in perspective. Fig. 3 is a plan view showing how the retaining-wires are united together. Figs. 4 and 5 are cross-sections showing slight modifications.

Like parts are represented by similar letters of reference in the several views.

In my improved tire I employ on the usual wheel-felly $a$ a retaining-band $b$, of iron or steel, preferably flat on one side to fit the wooden felly and provided on its other side with a central groove or depression $b'$. This central depression $b'$ preferably occupies about one-half the width of the tire. The corners, both at the top and bottom of this central depression, are preferably slightly rounded, and there is left on each side of this central depression plain supporting-seats $b^2$, these seats being each substantially half the width of the retaining groove or depression.

The rubber tire $c$ is formed with a corresponding longitudinal rib $c'$, to fit in the longitudinal retaining groove or depression $b'$, and the tire is perforated throughout its length with two openings, preferably within the ribbed portion, or substantially so, and through these perforations are extended independent retaining-wires $d$. The ends of each of these retaining-wires are joined together, as shown in Fig. 3 at $d'$, by brazing, electric welding, or otherwise, so that each is independent and endless. The rubber which forms the tire may be in one strip or several strips; but it is so placed on the retaining-wires that when the same are united the ends of the rubber will close over the joints in the wires and make a continuous band of rubber.

The supporting-band of iron or steel is preferably formed slightly concave on its outer surface, the bottom of the groove $b'$ and the plain seats $b^2$ being each preferably concave, the edges of the steel band being rounded, so as to project beyond the rubber portion and protect the same.

Fig. 4 shows a rim specially adapted for metal wheels, in which the wooden felly is omitted. Fig. 5 shows the same construction with the outer faces of the steel straight instead of concave. By this construction the retaining-wires being placed within the longitudinal rib of the rubber and below or substantially below the supporting-surfaces on either side thereof all the movement of the rubber in compressing will be above the retaining-wires, and the tendency to disintegrate at the point where the wires pass through will be obviated.

As is well known, rubber is non-compressible, or substantially so, and inasmuch as the ribbed portion will be supported firmly within the groove that part of the rubber remains inactive under compression, the main body of the rubber being by its elasticity adapted to move to compensate for the weights thereon, the movement occurring above the seats and above the retaining-wires. The inclined or concave seats also tend to afford more freedom of movement in the tire in compensating for unusual loads or unusual lateral or other shocks, while at the same time the tire is, in effect, hung loosely on the wheel by reason of the fact that there is no positive fastening between the rubber and the steel supporting-band, and the necessary freedom of movement is thus secured for the rubber in order to prevent its disintegration by the constant shocks which it receives in practical use.

Having thus described my invention, I claim—

1. In a carriage-tire, the combination with the metal supporting-band having a central depression or groove, and the plain side supports rounding into said groove, a rubber band having a tongue or projection to fit said groove and fitted at the sides to the plain supports, and independent retaining-bands extending through the rubber rib or projection so as to lie substantially within said groove when the tire is in place, substantially as specified.

2. The combination, in a carriage-tire, of a metallic band having a central groove and inclined or concave supporting-faces on each side thereof, a rubber tire having a longitudinal rib to fit said groove and provided on each side thereof with seating-surfaces to fit said supports, and independent retaining-wires passing through said rubber, substantially within said tongue or groove, substantially as specified.

In testimony whereof I have hereunto set my hand this 16th day of March, A. D. 1900.

ARTHUR W. GRANT.

Witnesses:
   CHAS. I. WELCH,
   EDMOND J. OGDEN.